US011908353B2

(12) United States Patent
Takeuchi et al.

(10) Patent No.: US 11,908,353 B2
(45) Date of Patent: Feb. 20, 2024

(54) INFORMATION PROCESSING APPARATUS AND INFORMATION PROCESSING SYSTEM

(71) Applicant: SEIKO EPSON CORPORATION, Tokyo (JP)

(72) Inventors: Kota Takeuchi, Matsumoto (JP); Hiroyuki Ichieda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/678,267

(22) Filed: Feb. 23, 2022

(65) Prior Publication Data

US 2022/0270526 A1 Aug. 25, 2022

(30) Foreign Application Priority Data

Feb. 24, 2021 (JP) ................................ 2021-027110

(51) Int. Cl.
*G09G 3/00* (2006.01)

(52) U.S. Cl.
CPC ....... *G09G 3/002* (2013.01); *G09G 2300/026* (2013.01); *G09G 2320/0626* (2013.01); *G09G 2340/0407* (2013.01)

(58) Field of Classification Search
None
See application file for complete search history.

(56) References Cited

U.S. PATENT DOCUMENTS

| 2015/0237317 | A1 | 8/2015 | Ehara | |
|---|---|---|---|---|
| 2017/0127028 | A1* | 5/2017 | Oike | .................... H04N 9/3185 |
| 2017/0208309 | A1* | 7/2017 | Oike | ...................... H04N 9/315 |
| 2019/0364253 | A1* | 11/2019 | Miyatani | ............... H04N 9/3147 |
| 2020/0077063 | A1 | 3/2020 | Yamasaki | |

FOREIGN PATENT DOCUMENTS

| CN | 104853128 A | 8/2015 |
|---|---|---|
| JP | 2016-085435 A | 5/2016 |
| JP | 2020-039019 A | 3/2020 |

* cited by examiner

*Primary Examiner* — Matthew Yeung
(74) *Attorney, Agent, or Firm* — Oliff PLC

(57) ABSTRACT

An information processing apparatus including one processor acquiring a first captured image by imaging projection surface wherein image light of a first projector is projected, acquiring second captured image by imaging projection surface on which image light of a second projector is projected, determining a first drawing range containing a drawing range in which a first image projected by the first projector is drawn and a drawing range in which a second image projected by the second projector is drawn based on the first captured image and the second captured image, drawing image in the first drawing range, dividing the image into a first image based on the drawing range in which the first image is drawn and a second image based on the drawing range in which the second image is drawn, outputting the first image to the first projector, and outputting the second image to the second projector.

3 Claims, 9 Drawing Sheets

INFORMATION PROCESSING APPARATUS AND INFORMATION PROCESSING SYSTEM

The present application is based on, and claims priority from JP Application Serial Number 2021-027110, filed Feb. 24, 2021, the disclosure of which is hereby incorporated by reference herein in its entirety.

BACKGROUND

1. Technical Field

The present disclosure relates to an information processing apparatus and an information processing system.

2. Related Art

In related art, tiling projection of displaying a single image by arranging images projected by a plurality of projectors on a projection surface is known.

For example, a projector disclosed in JP-A-2020-39019 acquires information of resolution from other projectors coupled thereto and reports resolution of the respective projectors in tiling projection to an image supply apparatus supplying image data.

However, to realize tiling projection, it is necessary to generate and report partial information representing cutout ranges of the image supplied from the image supply apparatus etc. to the respective projectors, and tiling settings are required.

SUMMARY

An aspect of the present disclosure is directed to an information processing apparatus including an acquisition unit acquiring a first captured image by imaging of a projection surface on which an image is projected by a first projector and a second captured image by imaging of the projection surface on which an image is projected by a second projector, a determination unit determining a drawing range in which images to be projected by the first projector and the second projector are drawn of a drawing screen in which the images to be projected by the first projector and the second projector are drawn based on the first captured image and the second captured image, a drawing unit drawing the images to be projected by the first projector and the second projector in the drawing range of the drawing screen determined by the determination unit, a division unit dividing the image drawn in the drawing range of the drawing screen into a first image to be projected by the first projector and a second image to be projected by the second projector, and an output unit outputting the first image divided by the division unit to the first projector and outputting the second image to the second projector.

Another aspect of the present disclosure is directed to an information processing system including an imaging apparatus generating a first captured image by imaging of a projection surface on which an image is projected by a first projector and a second captured image by imaging of the projection surface on which an image is projected by a second projector, and an information processing apparatus including an acquisition unit acquiring the first captured image and the second captured image, a determination unit determining a drawing range in which images to be projected by the first projector and the second projector are drawn of a drawing screen in which the images to be projected by the first projector and the second projector are drawn based on the first captured image and the second captured image, a drawing unit drawing the images to be projected by the first projector and the second projector in the drawing range of the drawing screen determined by the determination unit, a division unit dividing the image drawn in the drawing range of the drawing screen into a first image to be projected by the first projector and a second image to be projected by the second projector, and an output unit outputting the first image divided by the division unit to the first projector and outputting the second image to the second projector.

DESCRIPTION OF EXEMPLARY EMBODIMENTS

Figure 1:
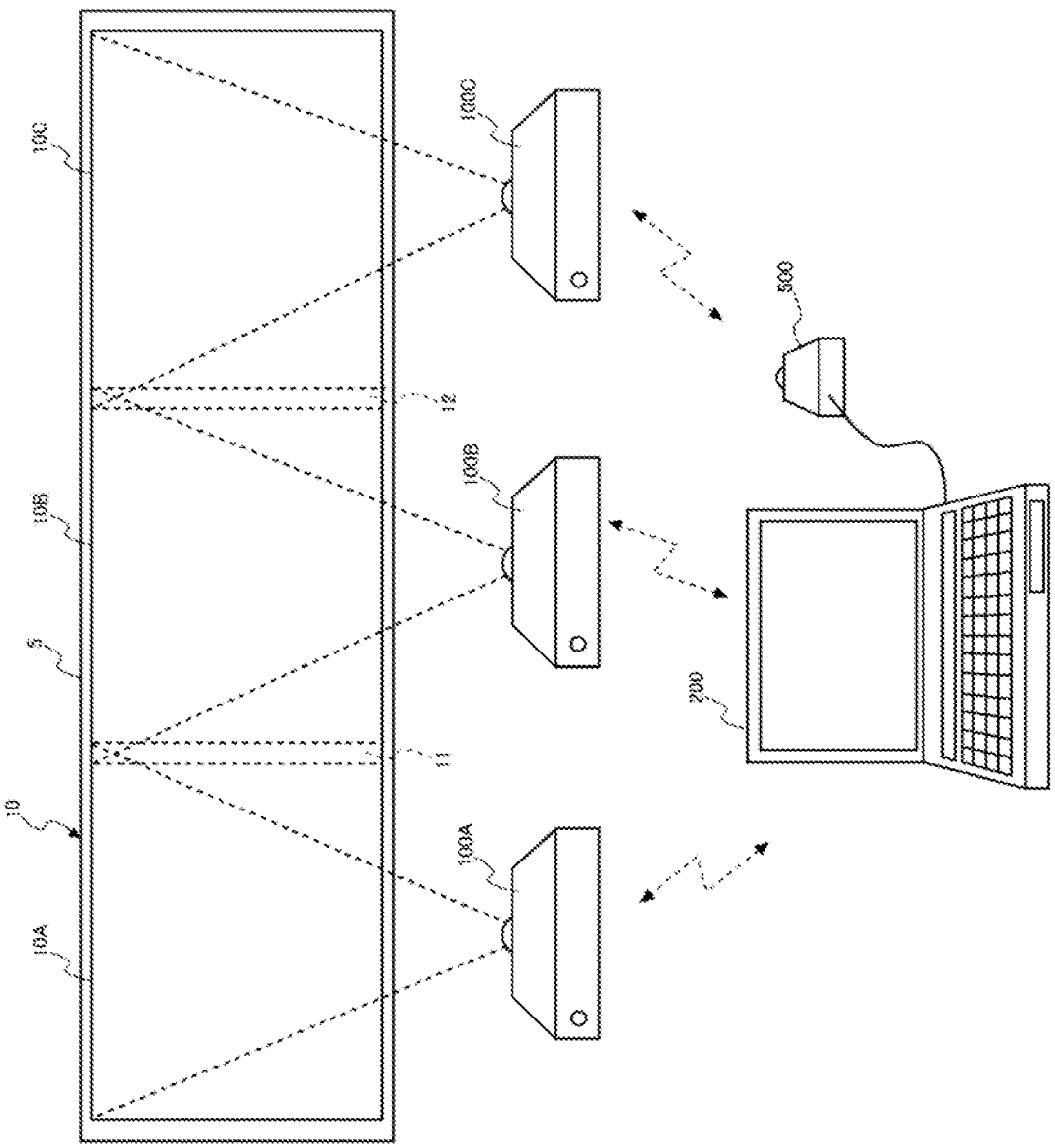
FIG. 1 is a system configuration diagram of an information processing system.

FIG. 1 is a system configuration diagram of an information processing system 1.

The information processing system 1 includes a plurality of projectors 100 displaying images on a projection surface 5, an information processing apparatus 200 supplying images to these plurality of projectors 100, and an imaging apparatus 500.

The information processing system 1 of the embodiment includes three projectors 100A, 100B, and 100C as the projectors 100, however, the number of the projectors 100 of the information processing system 1 is not limited to three. In the following description, when distinction among the projectors 100A, 100B, and 100C is not necessary for description, the projectors 100 are used. The projector 100A corresponds to a first projector, the projector 100B corresponds to a second projector, and the projector 100C corresponds to a third projector.

For the information processing apparatus 200, e.g. a notebook PC (Personal Computer), a desktop PC, a tablet terminal, a smartphone, a PDA (Personal Digital Assistant), or the like may be used.

The information processing apparatus 200 is wirelessly connected to the projectors 100A, 100B, and 100C and supplies image data to these projectors 100A, 100B, and 100C. In the embodiment, a form in which the information processing apparatus 200 and the projectors 100 are wirelessly connected is explained, however, the connection between the information processing apparatus 200 and the projectors 100 may be wired connection.

FIG. 1 exemplifies a case where the projectors 100A, 100B, and 100C are horizontally arranged in a line in lateral directions of the projection surface 5 and the respective projectors 100 display images on the projection surface 5 side by side. The installation method of the projectors 100A, 100B, and 100C is not limited to the horizontal installation, but can be a suspending installation of suspending the projectors 100A, 100B, and 100C from the ceiling or a wall hanging installation of hanging the projectors on the wall. Alternatively, the projectors 100A, 100B, and 100C may be installed in a line in longitudinal directions or, when many projectors 100 are coupled, the projectors 100 may be arranged in a matrix form of longitudinal N rows and lateral M columns (N and M are arbitrary natural numbers).

Areas of the projection surface 5 on which the projectors 100A, 100B, and 100C project image lights are called projection areas 10. The projector 100A projects the image light on a left projection area 10A of the projection surface 5. The projector 100B projects the image light on a center projection area 10B of the projection surface 5. The projector 100A projects the image light on a right projection area 10C of the projection surface 5.

The projectors 100A, 100B, and 100C perform tiling projection. The tiling projection is a projection method of displaying a single large-sized image by projecting image lights using the plurality of projectors 100 and coupling the images displayed by these plurality of projectors 100 on the projection surface 5.

In the tiling projection, the adjacent projectors 100 project image lights so that edges of the displayed images may overlap. This is for making boundaries between the displayed images unnoticeable. For example, the image displayed by the projector 100A and the image displayed by the projector 100B located on the right side thereof form an overlapping area 11 of the edges overlapping with each other. Similarly, the image displayed by the projector 100B and the image displayed by the projector 100C located on the right side thereof form an overlapping area 12 of the edges overlapping with each other.

The imaging apparatus 500 is a camera including an imaging device (not shown) such as a CCD (Charge Coupled Device) sensor or a CMOS (Complementary Metal Oxide Semiconductor) sensor. The imaging apparatus 500 is connected to the information processing apparatus 200 with wire and images the projection surface 5 according to an instruction by the information processing apparatus 200 and generates a captured image. The imaging range of the imaging apparatus 500 is set to a range containing the whole projection surface 5. The imaging apparatus 500 outputs the generated captured image to the information processing apparatus 200.

Figure 2:
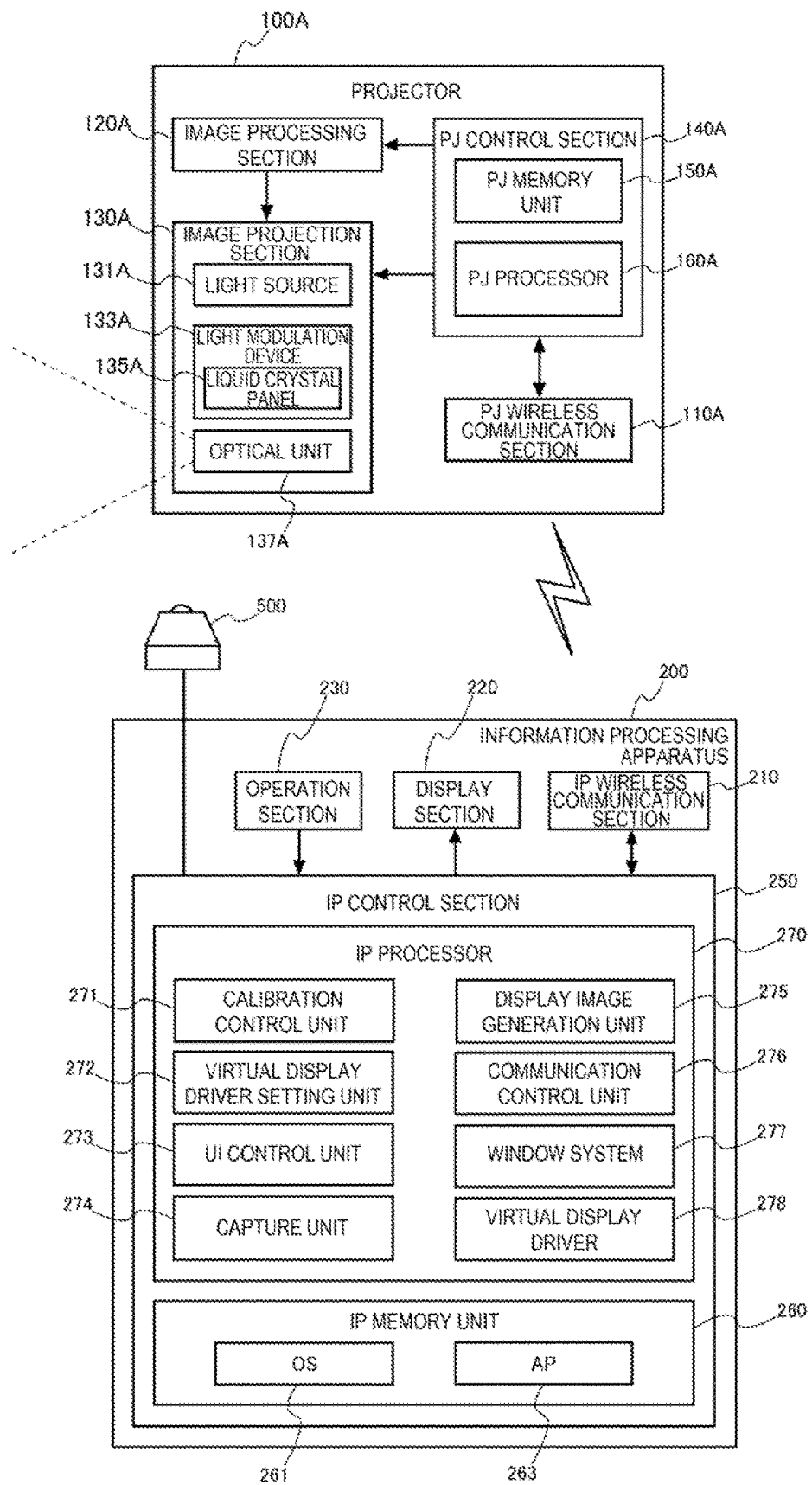
FIG. 2 shows configurations of a projector and an information processing apparatus.

FIG. 2 shows examples of configurations of the projector 100A and the information processing apparatus 200.

The projectors 100A, 100B, and 100C have substantially the same configurations. Accordingly, the configuration of the projector 100A will be representatively explained and the explanation of the other projectors 100B and 100C will be omitted. Further, in the following description, to distinguish the configurations of the respective projectors 100, the configurations of the projector 100A have signs "A", the configurations of the projector 100B have signs "B", and the configurations of the projector 100C have signs "C" for explanation.

The projector 100A includes a PJ wireless communication section 110A, an image processing section 120A, an image projection section 130A, and a PJ control section 140A.

The PJ wireless communication section 110A is an interface for wireless communication with external apparatuses including the information processing apparatus 200. The PJ wireless communication section 110A includes e.g. a network interface card such as a wireless LAN card. The PJ wireless communication section 110A makes wireless communications with external apparatuses and transmits and receives various kinds of information.

Image data is input from the PJ control section 140A to the image processing section 120A. Image data received by the PJ wireless communication section 110A is input to the PJ control section 140A. The PJ control section 140A outputs the input image data to the image processing section 120A. In this regard, the PJ control section 140A may output parameters corresponding to image processing to be executed by the image processing section 120A to the image processing section 120A.

The image processing section 120A develops the input image data in a frame memory (not shown) and performs image processing on the developed image data. The image processing performed by the image processing section 120A includes e.g. resolution transform processing, shape correction processing for distortion correction or the like, digital zoom processing, tone correction processing, and brightness correction processing. The image processing section 120A executes the processing designated by the PJ control section 140A, and performs processing using the parameters input from the PJ control section 140A as necessary. Further, the image processing section 120A can combine and execute a plurality of pieces of processing of the above described processing. The image processing section 120A reads the processed image data from the frame memory and outputs the read image data as image information to the image projection section 130A.

The image projection section 130A includes a light source 131A, a light modulation device 133A, and an optical unit 137A. The light modulation device 133A includes liquid crystal panels 135A as modulation elements that modulate lights of the light source 131A. The liquid crystal panel 135A corresponds to a drawing panel.

The liquid crystal panels 135A are provided for each color of red, green, and blue. The liquid crystal panel 135A includes e.g. a transmissive liquid crystal panel in which liquid crystal is enclosed between a pair of transparent substrates. In the liquid crystal panel 135A, a pixel area containing a plurality of pixels arranged in a matrix form is formed, and drive voltages can be applied to the liquid crystal with respect to each pixel.

The image information is input from the image processing section 120A to the light modulation device 133A. The light modulation device 133A applies drive voltages according to the input image information to the respective pixels of the pixel area and sets the respective pixels at light transmission rates according to the image information. The light output from the light source 131A is transmitted through the pixel areas of the liquid crystal panels 135A and modulated with respect to each pixel and image lights according to the image information are formed with respect to each color light. The formed image lights of the respective colors are combined with respect to each pixel by a color combining system (not shown) into an image light representing a color image and enlarged and projected on the projection surface 5 by the optical unit 137A.

The PJ control section 140A is a computer device including a PJ memory unit 150A and a PJ processor 160A. The PJ control section 140A performs integrated control of the operation of the projector 100A by the PJ processor 160A operating according to a control program stored in the PJ memory unit 150A.

The PJ memory unit 150A includes memories such as a RAM (Random Access Memory) and a ROM (Read Only Memory). The RAM is used for temporary storage of various kinds of data etc., and the ROM stores control programs for controlling the operation of the projector 100A, various kinds of setting information, etc.

The PJ processor 160A is an arithmetic processing device including a CPU (Central Processing Unit) and a MPU (Micro Processing Unit). The PJ processor 160A controls the respective parts of the projector 100A by executing the control program. The PJ processor 160A may be formed using a single processor or using a plurality of processors.

Next, the configuration of the information processing apparatus 200 will be explained.

The information processing apparatus 200 includes an IP wireless communication section 210, a display section 220, an operation section 230, and an IP control section 250.

The IP wireless communication section 210 is an interface for wireless communication with external apparatuses including the projectors 100. The IP wireless communication section 210 includes e.g. a network interface card such as a wireless LAN card. The IP wireless communication section 210 makes wireless communications with external apparatuses and transmits and receives various kinds of information.

The display section 220 includes a display panel such as a liquid crystal panel or an organic EL panel, and a drive circuit driving the display panel. The display section 220 generates a display signal that can be displayed on the display panel based on a display control signal generated by the IP control section 250, and outputs the generated display signal to the display panel. The display panel displays a window corresponding to the input display signal.

The operation section 230 includes e.g. an input device such as a mouse and a keyboard, and receives operation by a user. The operation section 230 outputs an operation signal corresponding to the received operation to the IP control section 250. Further, the operation section 230 may include a touch panel detecting touch operation on the display panel. In this case, the operation section 230 outputs coordinate information of the display panel representing the detected position of the touch operation to the IF control section 250.

The IP control section 250 is a computer device including an IP memory unit 260 and an IP processor 270, and performs integrated control of the respective parts of the information processing apparatus 200.

The IP memory unit 260 includes memories such as a RAM and a ROM. The RAM is used for temporary storage of various kinds of data etc., and the ROM stores control programs for cent, rolling the operation of the information processing apparatus 200, various kinds of setting information, etc. The control programs include an OS (Operating System) 261 and an application program 263. The application program 263 is abbreviated as "AP 263".

The IP processor 270 is an arithmetic processing device including a CPU and a MPU. The IP processor 270 controls the respective parts of the information processing apparatus 200 by executing the control programs. The IP processor 270 may be formed using a single processor or using a plurality of processors.

The IP control section 250 includes a calibration control unit 271, a virtual display driver setting unit 272, a UI control unit 273, a capture unit 274, a display image generation unit 275, a communication control unit 276, a window system 277, and a virtual display driver 278 as functional blocks. The calibration control unit 271, the virtual display driver setting unit 272, the UP control unit 273, the capture unit 274, the display image generation unit 275, and the communication control unit 276 are functions realized by the IP processor 270 executing the AP 263. The window system 277 the IP processor 270 executing the OS 261.

Figure 3:
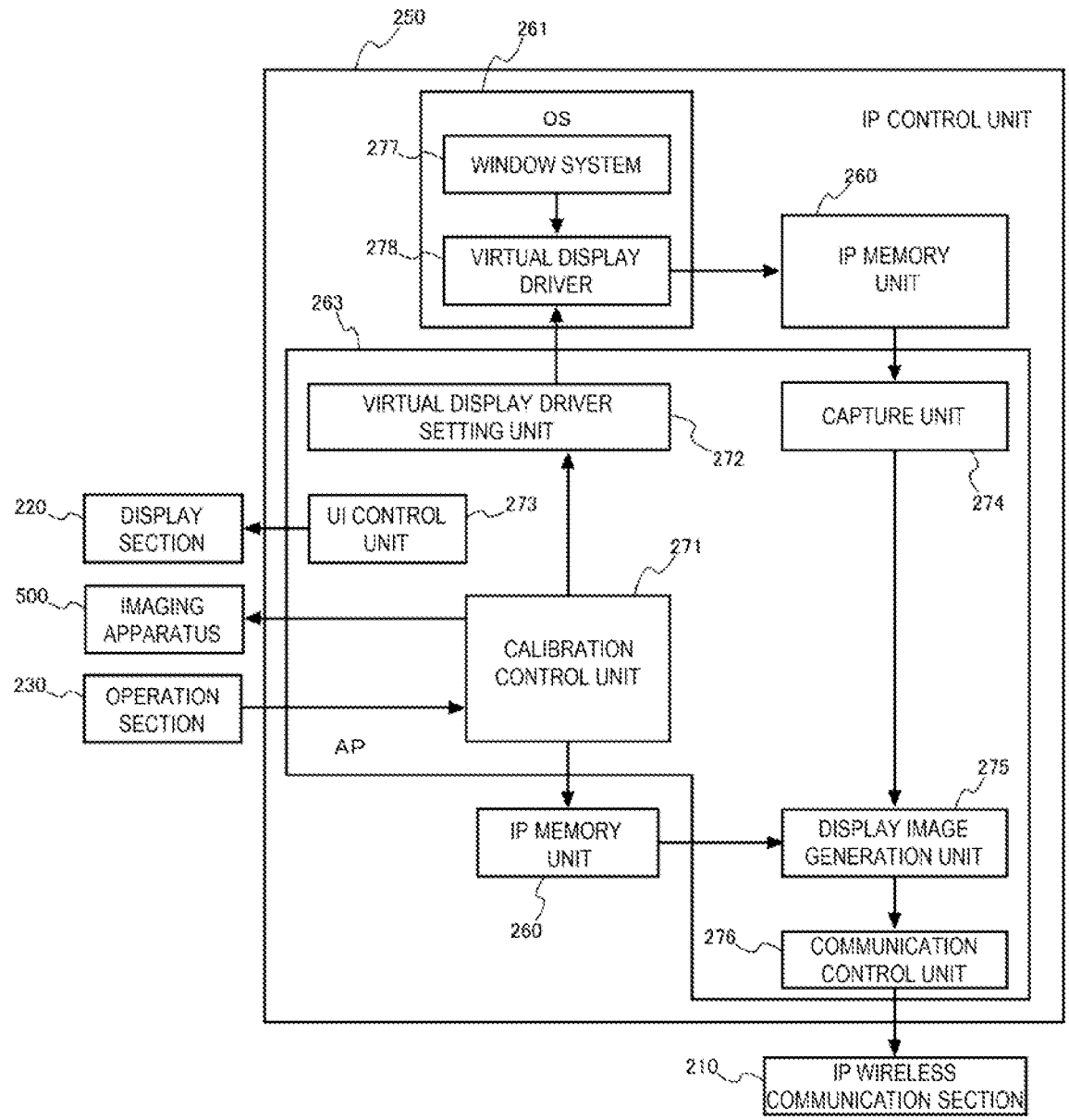
FIG. 3 shows a flow of processing of functional blocks of an IP control section and a flow of data.

The operations of the respective functional blocks of the IP control section 250 will be explained with reference to FIG. 3. FIG. 3 shows a flow of processing of the functional blocks of the IP control section 250 and a flow of data.

The calibration control unit 271 generates adjustment data. The adjustment data generated by the calibration control unit 271 includes resolution of a virtual display and calibration data. The virtual display corresponds to a drawing screen.

The virtual display refers to a virtual display in which images as sources of image lights projected on the projection surface 5 by the projectors 100A, 100B, and 100C are developed. More specifically, the virtual display is a memory area secured in the IP memory unit 260 by the IP processor 270 executing the OS 261, and captures the images developed in the memory area and outputs the captured images to the respective projectors 100. Thereby, the images developed in the memory area as the virtual display are displayed on the projection surface 5 by the projectors 100A, 100B, and 100C.

Figure 4:
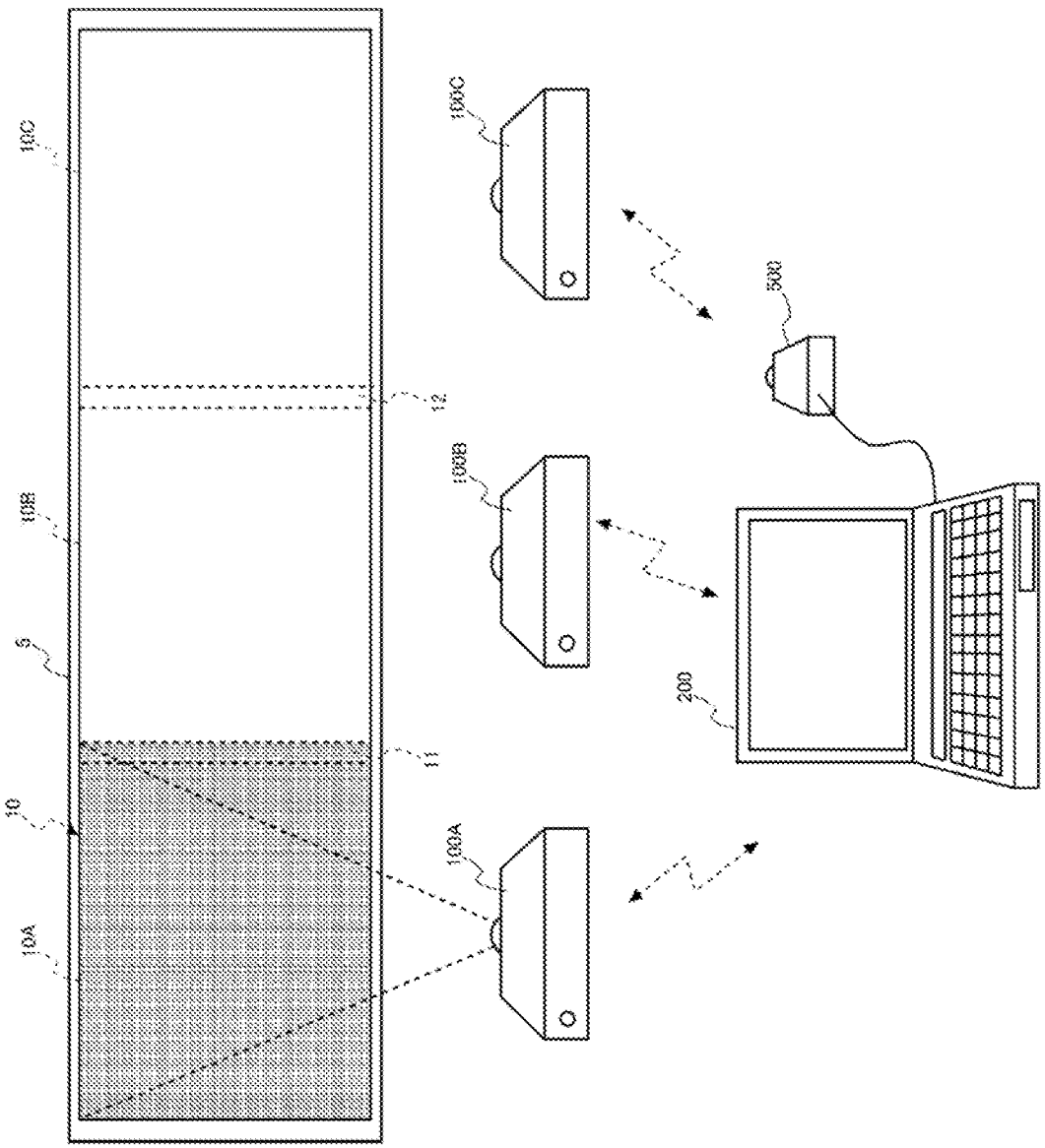
FIG. 4 shows a projection area in which a pattern image is displayed.

FIG. 4 shows the projection area 10A in which a pattern image is displayed.

The operation of the calibration control unit 271 is explained.

The calibration control unit 271 functions as an acquisition unit acquiring captured images.

The calibration control unit 271 first transmits an instruction signal for instructing projection of the pattern image to the wirelessly connected projector 100A. For the pattern image, e.g. an image with a lattice pattern as shown in FIG. A formed therein is used.

When receiving a report signal reporting completion of projection of the pattern image from the projector 100A, the calibration control unit 271 transmits an instruction signal for instructing imaging of the projection surface 5 to the imaging apparatus 500.

When receiving the instruction signal, the imaging apparatus 500 images the projection surface 5 and generates a captured image. The imaging apparatus 500 transmits the generated captured image to the information processing apparatus 200.

The information processing apparatus 200 stores the received captured image in the IP memory unit 260. The captured image by imaging of the projection surface 5 with the pattern image displayed in the projection area 10A is referred to as "first captured image".

The calibration control unit 271 respectively instructs the projectors 100B and 100C to display the pattern image. When the projectors 100B, 100C display the pattern image in the projection areas 10B, 10C, the calibration control unit 271 instructs the imaging apparatus 500 to image. The information processing apparatus 200 stores the captured images received from the imaging apparatus 500 in the IP memory unit 260. The captured image by imaging of the projection surface 5 with the pattern image projected in the projection area 10B is referred to as "second captured image". The captured image by imaging of the projection surface 5 with the pattern image projected in the projection area 10C is referred to as "third captured image".

Then, the calibration control unit 271 calculates resolution of the virtual display.

In the virtual display, the images to be displayed by the projectors 100A, 100B, and 100C are developed. In the embodiment, a case where the images to be displayed by the projectors 100A, 100B, and 100C are coupled images is explained. The coupled images refer to images recognized as a single image by coupling of the images displayed by the projectors 100A, 100B, and 100C.

First, the calibration control unit 271 respectively specifies the ranges in which the pattern image is captured from the first captured image, the second captured image, and the third captured image.

Hereinafter, the range of the first captured image in which the pattern image is captured is referred to as "first pre-transform range 301", the range of the second captured image in which the pattern image is captured is referred to as "second pre-transform range 302", and the range of the third captured image in which the pattern image is captured is referred to as "third pre-transform range 303".

Figure 5:
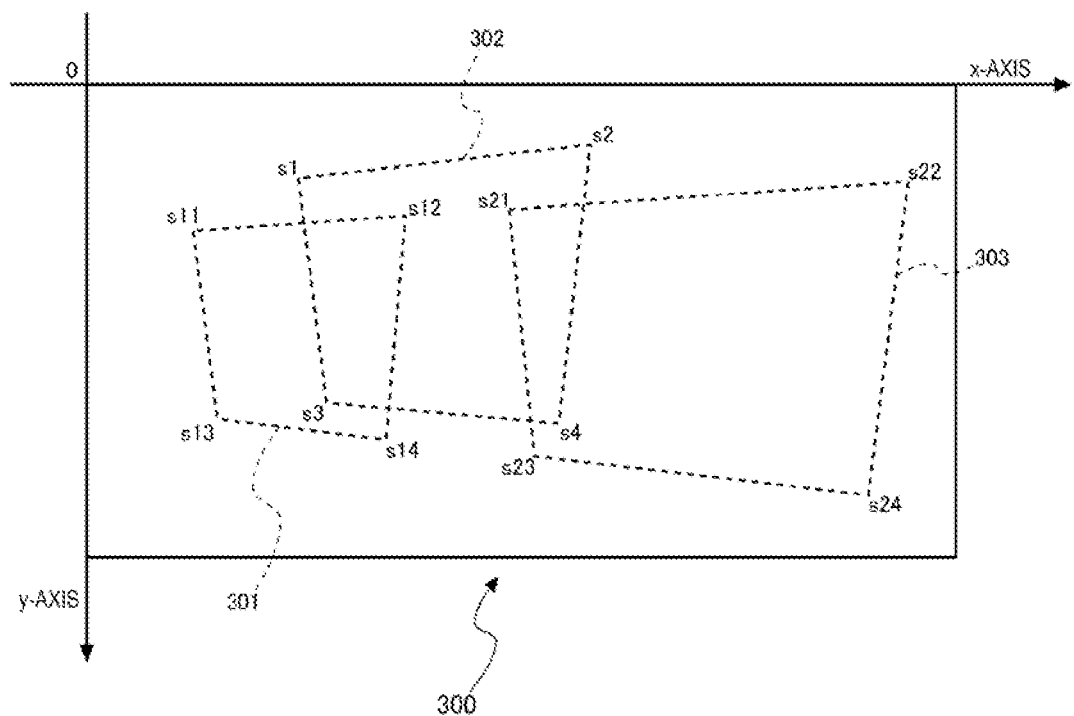
FIG. 5 shows a pre-transform image.

FIG. 5 shows a pre-transform image 300.

When specifying the imaging ranges of the pattern image, the calibration control unit 271 plots the specified first pre-transform range 301, second pre-transform range 302, and third pre-transform range 303 in an image having the same size as the captured image of the imaging apparatus 500 and generates the pre-transform image 300.

In the pre-transform image 300, a coordinate system is set as shown in FIG. 5. The coordinate system is a coordinate system having the origin on the upper left of the pre-transform image 300, an x-axis in lateral directions of the pre-transform image 300, and a y-axis in longitudinal directions of the pre-transform image 300.

Further, four vertexes of the first pre-transform range 301 are referred to as "s11", "s12", "s13", and "s14", four vertexes of the second pre-transform range 302 are referred to as "s1", "s2", "s3", and "s4", and four vertexes of the third pre-transform range 303 are referred to as "s21", "s22", "s23", and "s24".

Then, the calibration control unit 271 generates a rectangular figure 402 corresponding to panel resolution as a panel size of a liquid crystal panel 135B of the projector 100B on a post-transform image 400. The post-transform image 400 is an image in which the ranges after projection transform of the first pre-transform range 301, the second pre-transform range 302, and the third pre-transform range 303 are shown. The projection transform will be described later.

The figure 402 is set to a size corresponding to the panel resolution of the liquid crystal panel 135B. For example, when the panel resolution of the liquid crystal panel 135B is 1920×1080, the size of the figure 402 is set to correspond to 1920×1080 on the post-transform image 400.

Further, the figure 402 is placed substantially at the center of the post-transform image 400. This is because the second pre-transform range 302 corresponds to the projection area 10B of the projector 100B located at the center of the three projectors 100 arranged in a line in the lateral directions. This is for the ranges after projection transform of the first pre-transform range 301 and the third pre-transform range 303 placed on the post-transform image 400.

Figure 6:
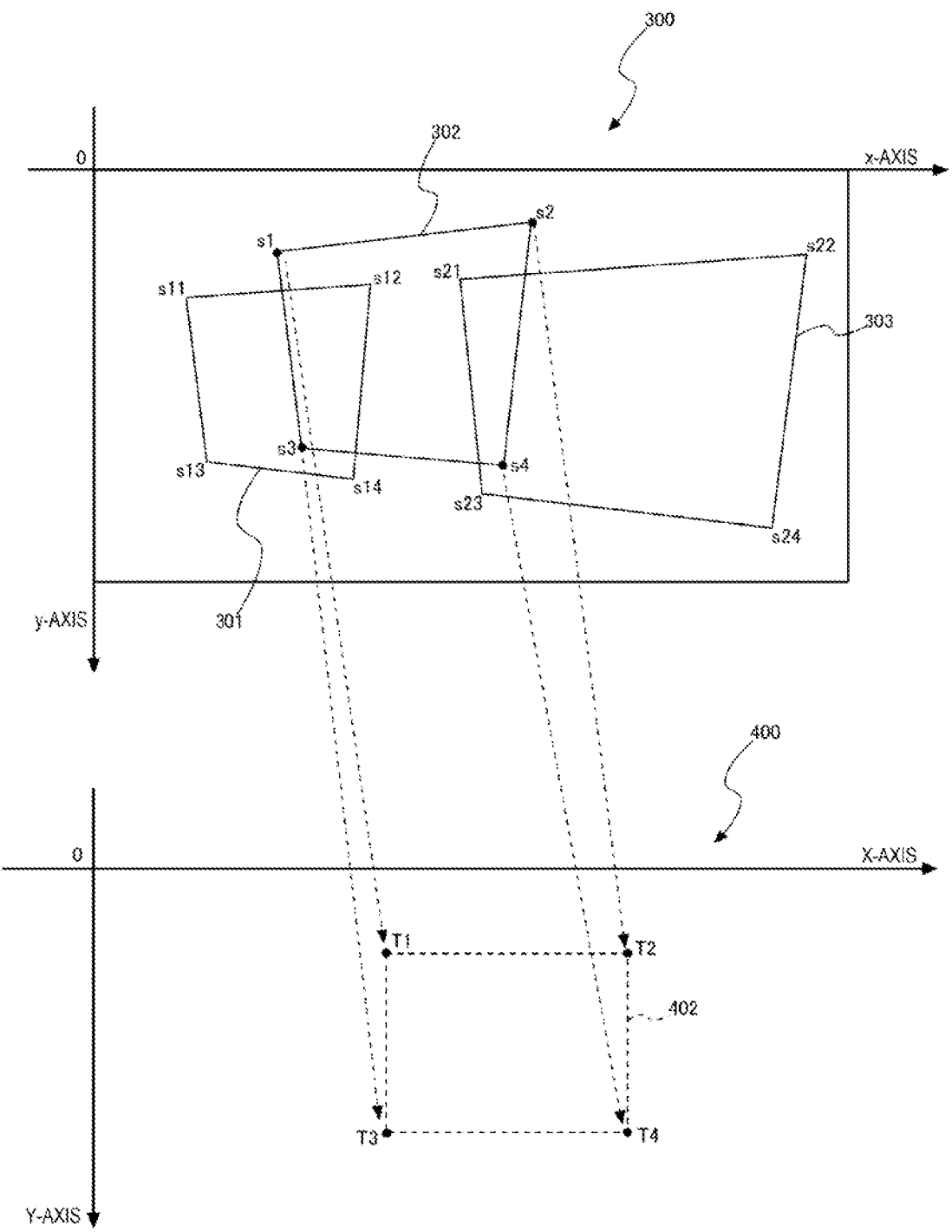
FIG. 6 shows a state in which a second pre-transform range is projection-transformed on a post-transform image.

FIG. 6 shows a state in which the second pre-transform range 302 of the pre-transform image 300 is projection-transformed on the post-transform image 400. A coordinate system is also set for the post-transform image 400. As shown in FIG. 6, the coordinate system is a coordinate system having the origin on the upper left of the post-transform image 400, an X-axis in lateral directions of the post-transform image 400, and a Y-axis in longitudinal directions of the post-transform image 400.

The calibration control unit 271 calculates a determinant M of projection transform to transform the four-vertexes s1, s2, s3, s4 of the second pre-transform range 302 shown in the pre-transform image 300 to four vertexes T1, T2, T3, T4 of the figure 402. The determinant M of projection transform corresponds to a transform expression.

Figure 7:
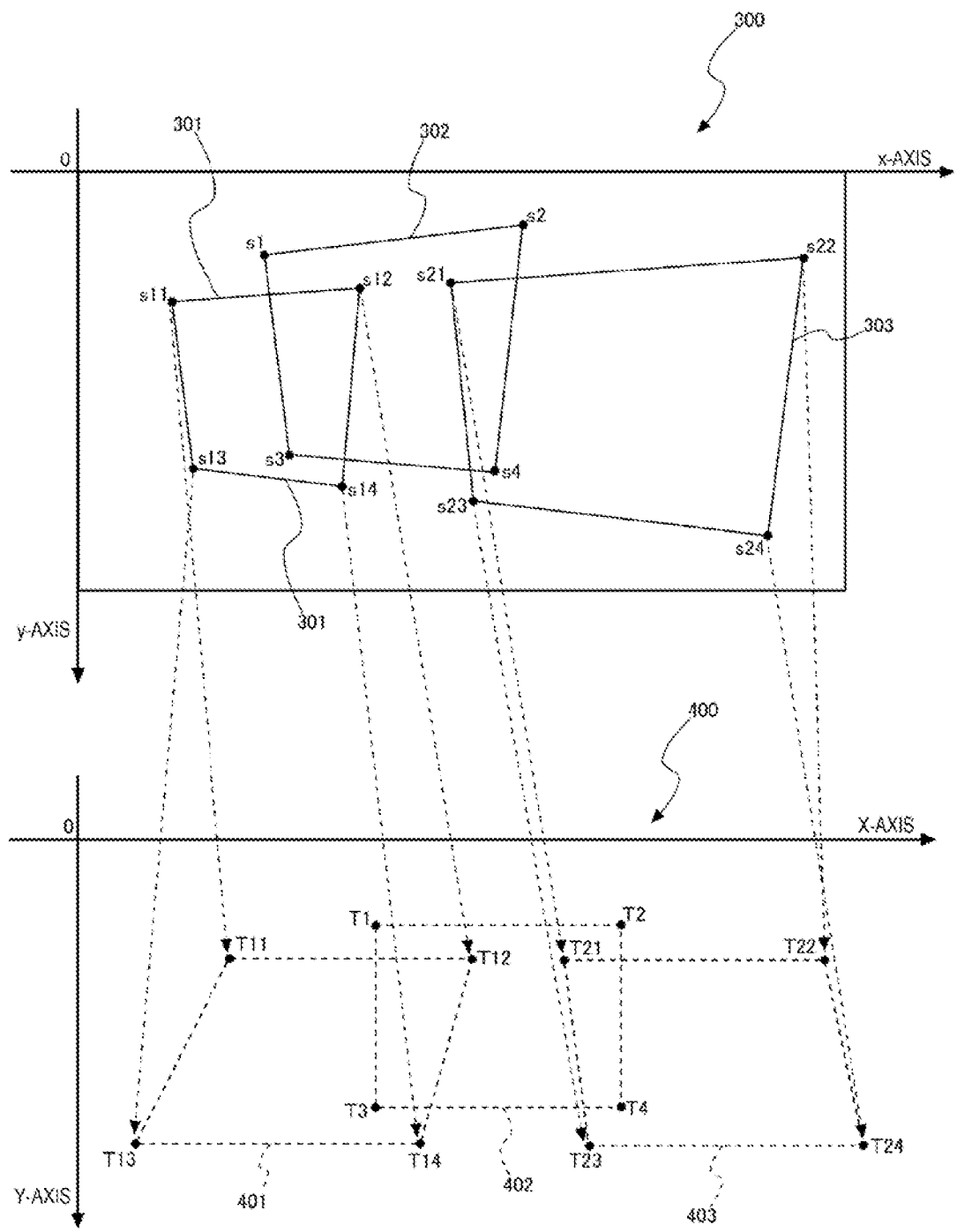
FIG. 7 shows a state in which a first pre-transform range and a third pre-transform range are projection-transformed on the post-transform image.

FIG. 7 shows a state in which the four vertexes of the first pre-transform range 301 and the third pre-transform range 303 are projection-transformed on the post-transform image 400.

The calibration control unit 271 calculates the determinant M of projection transform, and then, projection-transforms the four vertexes s11, s12, s13, s14 of the first pre-transform range 301 and the four vertexes s21, s22, s23, s24 of the third pre-transform range 303 using the calculated determinant M.

The coordinates after projection transform of the vertexes s11, s12, s13, s14 are referred to as "T11", "T12", "T13", "T14", respectively. Further, the coordinates after projection transform of the vertexes s21, s22, s23, s24 are referred to as "T21", "T22", "T23", "T24", respectively.

The calibration control unit 271 generates a figure 401 by plotting the four project ion-transformed vertexes T11, T12/T13, T14 on the post-transform image 400. Further, the calibration control unit 271 generates a figure 403 by plotting the four projection-transformed vertexes T21, T22, T23, T24 on the post-transform image 400.

Figure 8:
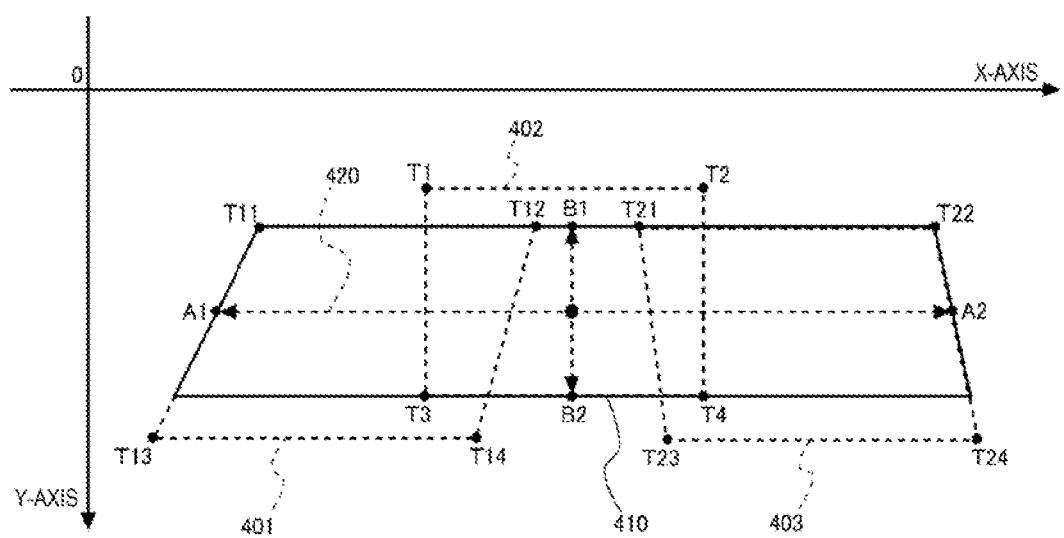
FIG. 8 shows a display range of a virtual display.

FIG. 8 shows a range of the virtual display in the post-transform image.

Then, the calibration control unit 271 determines a drawing range of the drawing screen and determines the resolution, of the virtual display based on the figures 401, 402, and 403 generated on the post-transform image 400. The calibration control unit 271 corresponds to a determination unit.

The calibration control unit 271 first determines a range in Y-axis directions of the virtual display. The calibration control unit 271 determines a range in the Y-axis directions where all figures of the figure 401, the figure 402, and the figure 403 exist as the range in the Y-axis directions of the virtual display. In the example shown in FIG. 8, the calibration control unit 271 determines a range equal to or larger than a point B1 and equal to or smaller than a point B2 on the Y-axis as the range in the Y-axis directions of the virtual display. The Y-axis directions, i.e., the longitudinal directions cf the projection surface 5 should be set for the ranges in which the images can be displayed by all projectors 100. Accordingly, the calibration control unit 200 determines the range equal to or larger than the point B1 and equal to or smaller than the point B2 as the range in the Y-axis directions of the virtual display.

Then, the calibration control unit 271 determines a range in X-axis directions of the virtual display. The calibration control unit 271 determines a range equal to or larger than a point A1 and equal to or smaller than a point A2 on the X-axis shown in FIG. 8 as the range in the X-axis directions of the virtual display. The point A1 is a point at which a line segment 420 passing through the center of the determined range in the Y-axis directions of the virtual display intersects with the left end of the figure 401. The point A2 is a point at which the line segment 420 intersects with the right end of the figure 403.

Then, the calibration control unit 271 calculates the resolution of the virtual display based on the determined range in the X-axis directions and range in the Y-axis directions cf the virtual display. The calibration control unit 271 calculates the length in the X-axis directions of the virtual display by subtracting the X-coordinate value of the point A1 from the X-coordinate value of the point A2. The length in the X-axis directions of the figure 402 is set to a length corresponding to the panel resolution in the X-axis directions of the liquid crystal panel 135B. Accordingly, the calibration control unit 271 calculates resolution corresponding to the obtained length in the X-axis directions of the virtual display based on the length in the X-axis directions of the figure 402.

Further, regarding the resolution in the Y-axis directions/similarly/the calibration control unit 271 calculates the length in the Y-axis directions of the virtual display by subtracting the Y-coordinate value of the point B1 from the Y-coordinate value of the point B2. Then, the calibration control unit 271 calculates resolution corresponding to the obtained length in the Y-axis directions of the virtual display based on the length in the Y-axis directions of the figure 402.

The calibration control unit 271 calculates the resolution in the X-axis directions and the Y-axis directions of the virtual display, and then, outputs information of the calculated resolution to the virtual display driver setting unit 272.

In the embodiment, the case where the calibration control unit 271 calculates the determinant M of projection transform to transform the four vertexes s1, s2, s3, s4 of the second pre-transform range 302 into the four vertexes T1, T2, T3, T4 of the figure 402 is explained.

As another method than the calculation of the determinant M of projection transform, a transform rate for transforming the second pre-transform range 302 into the rectangular figure 402 corresponding to the panel resolution of the projector 100B may be obtained. The transform rate includes a transform rate in the X-axis directions and a transform rate in the Y-axis directions.

For example, in a case where the projectors 100A and 100B are correctly opposed to the projection surface 5 and shape correction such as trapezoidal distortion correction is not necessary for the images to be displayed on the projection surface 5 by the projectors 100A and 100B or the like, the transform rates may be calculated. The figures 401, 402, and 403 may be calculated by enlargement of the respective sides of the first pre-transform range 301, the second pre-transform range 302, and the third pre-transform range 303 using the calculated transform rates.

When the information of resolution is input from the calibration control unit 271, the virtual display driver setting unit 272 sets the input information of resolution in the virtual display driver 278.

The window system 277 and the virtual display driver 278 are functions realized by the IP processor 270 executing the OS 261. The window system 277 is a system for displaying a window. The window refers to a window in which the application software operates and corresponds to the application software one-on-one.

The virtual display driver 278 secures a memory area of resolution set by the virtual display driver setting unit 272 as the virtual display in the IP memory unit 260. The virtual display driver 278 draws an image generated by the window system 277 in the memory area secured in the IP memory unit 260. The virtual display driver 278 corresponds to a drawing unit.

The UI control unit 273 displays a UI (User Interface) window to be displayed in the display section 220 of the information processing apparatus 200. In the UI window, a button receiving an operation to change the resolution of the virtual display etc. are displayed. When receiving the operation to change the resolution of the virtual display, the operation section 230 outputs an operation signal corresponding to the received operation to the calibration control unit 271. When the operation signal is input from the operation section 230, the calibration control unit 271 outputs resolution changed according to the input operation signal to the virtual display driver setting unit 272.

The calibration control unit 271 generates calibration data. The calibration data is data generated for each of the projectors 100. The calibration data contains data for correction of the shapes of the images displayed on the projection surface 5 by the respective projectors 10C. Further, the calibration data contains data representing the ranges in which the respective projectors 100 display the images of the projection areas 10 of the projection surface 5.

First, the calibration control unit 271 detects the projection areas 10 of the projection surface 5 based on the first pre-transform range 301 of the first captured image, the second pre-transform range 302 of the second captured image, and the third pre-transform range 303 of the third captured image.

Then, the calibration control unit 271 generates calibration data for correction of the shape of the first pre-transform range 301 specified from the first captured image to a rectangular shape. Similarly, the calibration control unit 271 generates calibration data for correction of the shape of the second pre-transform range 302 specified from the second captured image to a rectangular shape, and generates calibration data for correction of the shape of the third pre-transform range 303 specified from the third captured image to a rectangular shape.

Further, the calibration control unit 271 specifies a range corresponding to the projection area 10 of the first captured image and corrects the shape of the first pre-transform range 301 to a rectangular shape using the calibration data. The calibration control unit 271 generates calibration data representing the range of the image to be displayed by the projector 100A based on the range corresponding to the projection area 10 and the range corresponding to the first pre-transform range 301 in the corrected shape in the first captured image.

The calibration control unit 271 performs the same processing on the second captured image, and generates calibration data representing the range of the image to be displayed by the projector 100B.

The calibration control unit 271 performs the same processing on the third captured image, and generates calibration data representing the range of the image to be displayed by the projector 100C.

The calibration control unit 271 stores the generated calibration data in the IP memory unit 260.

The capture unit 274 captures the image developed in the memory area of the IP memory unit 260 by the virtual display driver 278. The capture unit 274 outputs the captured image to the display image generation unit 275.

The captured image captured by the capture unit 274 is input to the display image generation unit 275. The display image generation unit 275 functions as a division unit and generates divisional images by dividing the captured image with respect to each range of the images to be displayed by the respective projectors 100 with reference to the calibration data stored in the IP memory unit 260. The display image generation unit 275 divides the captured image and generates a first divisional image to be displayed by the projector 100A, a second divisional image to be displayed by the projector 100B, and a third divisional image to be displayed by the projector 100C. Further, the display image generation unit 275 corrects shapes of the generated first divisional image, second divisional image, and third divisional image with reference to the calibration data.

The display image generation unit 275 outputs the divided and shape-corrected first divisional image, second divisional image, and third divisional image to the communication control unit 276. The first divisional image corresponds to a first image and the second divisional image corresponds to a second image.

The communication control unit 276 controls the IP wireless communication section 210 and mutually makes data communication with the projectors 100A, 100B, and 100C. The first divisional image, the second divisional image, and the third divisional image are input from the display image generation unit 275 to the communication control unit 276. The communication control unit 276 transmits the input first divisional image, second divisional image, and third divisional image to the projectors 100 to display these first divisional image, second divisional image, and third divisional image on the projection surface 5. The communication control unit 276 corresponds to an output unit.

Figure 9:
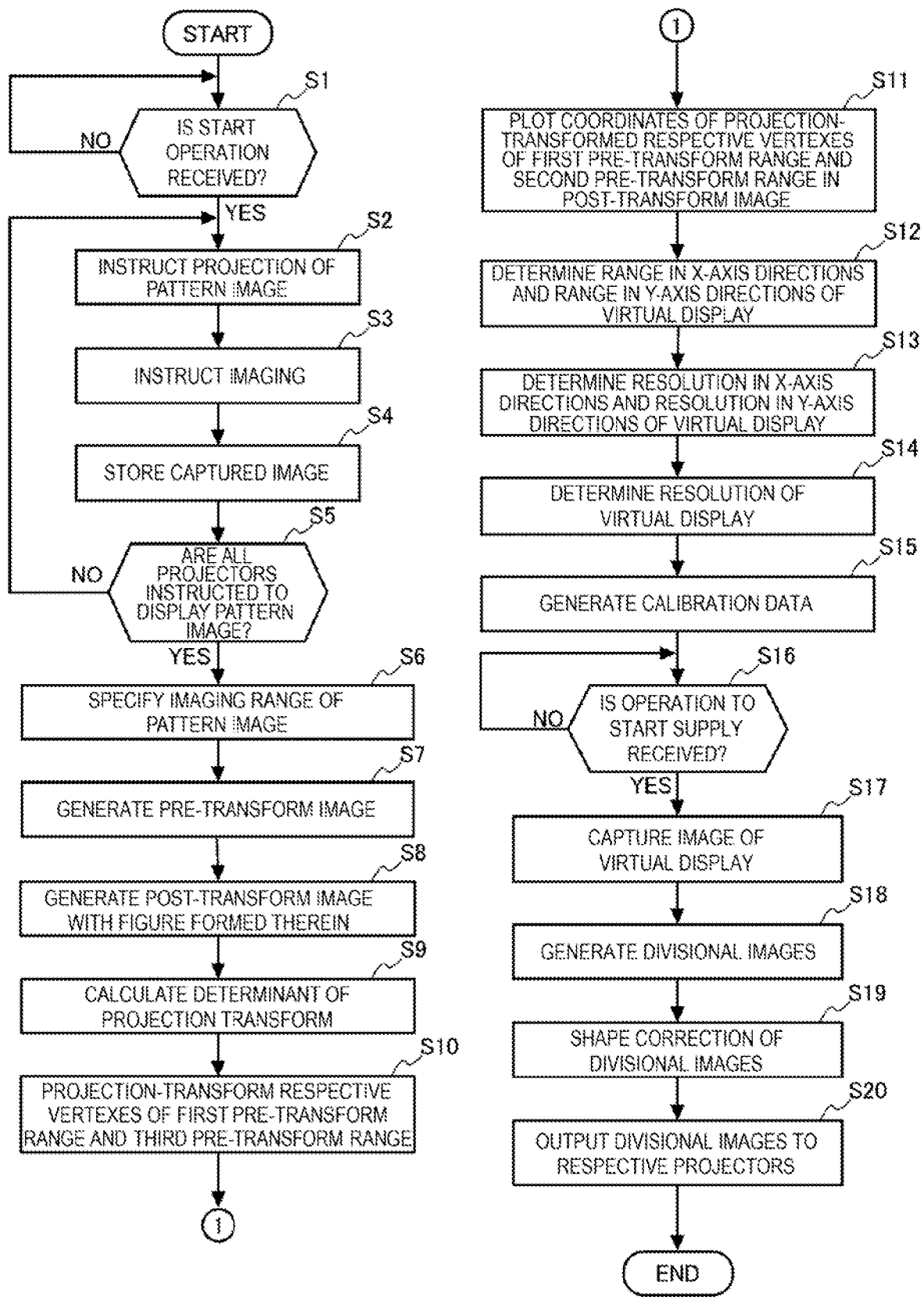
FIG. 9 is a flowchart showing operations of the information processing apparatus.

FIG. 9 is a flowchart showing operations of the information processing apparatus 200.

The operations of the information processing apparatus 200 will be explained with reference to the flowchart shown in FIG. 9.

First, the IP control section 250 determines whether or not a start operation to instruct generation of adjustment data is received by the operation section 230 (step S1). When the start operation is not received (step S1/NO), the IP control section 250 waits until the start operation is received.

When the start operation is received (step S1/YES), the IP control section 250 selects one of the wirelessly connected projectors 100 and transmits an instruction signal to display the pattern image to the selected projector 100 (step S2).

Then, the IP control section 250 transmits an instruction signal to instruct imaging to the imaging apparatus 500 (step S3). When receiving a captured image by imaging of the projection surface 5, the IP control section 250 stores the received captured image in the IP memory unit 260 (step S4).

Then, the IP control section 250 determines whether or not to instruct all projectors 100 to display the pattern image (step S5). When instructing net all the projectors 100 to display the pattern image (step S5/NO), the IP control section 250 returns to step S2 and transmits an instruction signal to instruct the projectors 100 to display the pattern image.

The IP control section 250 instructs all projectors 100 to display the pattern image (step S5/YES) and stores the first captured image, the second captured image, and the third captured image in the IP memory unit 260, and then, goes to the next step.

The IP control section 250 reads the first captured image from the IP memory unit 260 and specifies the first pre-transform range 301 of the read first captured image. The first pre-transform range 301 is an imaging range in which the pattern image is captured. The IP control section 250 similarly reads the second captured image and the third captured image from the IP memory unit 260 and respectively specifies the second pre-transform range 302 and the third pre-transform range 303. The first pre-transform range 301 corresponds to a first imaging range and the second pre-transform range 302 corresponds to a second imaging range.

Then, the IP control section 250 generates the pre-transform image 300 in which the specified first pre-transform range 301, second pre-transform range 302, and third pre-transform range 303 are shown (step S7). Then, the IP control section 250 generates the post-transform image 400 in which the rectangular figure 402 corresponding to the panel resolution of the liquid crystal panel 135B is formed (step S8).

Then, the IP control section 250 obtains the determinant M of projection transform to transform the coordinates of the four vertexes indicating the range of the second pre-transform range 302 into the coordinates of the four vertexes of the figure 402 (step S3).

Then, the IP control section 250 projection-transforms the respective vertexes of the first pre-transform range 301 and the third pre-transform range 303 using the determinant M of projection transform calculated at step S3 (step S10). The IP control section 250 plots the obtained transformed coordinates of the respective vertexes of the first pre-transform range 301 and the third pre-transform range 303 on the post-transform image 400 (step S11) to form the figures 401 and 403 on the post-transform image 400.

Then, the IP control section 250 determines the range in the Y-axis directions and the range in the X-axis directions of the virtual display based on the post-transform image 400 with the figures 401, 402, and 403 formed thereon (step S12). As shown in FIG. 6, the IP control section 250 determines the range containing ail the figures 401, 402, and 403 as the range in the Y-axis directions of the virtual display.

Further, as shown in FIG. 8, the IP control section 250 determines a part passing through the center of the range in the Y-axis directions of the virtual display between the intersection point. A1 with the left end of the figure 401 and the intersection point A2 with the right end of the figure 403 as the range in the X-axis directions of the virtual display.

Then, the IP control section 230 determines the resolution in the X-axis directions and the resolution in the Y-axis directions of the virtual display based on the determined range in the X-axis directions and range in the Y-axis directions of the virtual display (step 313). The IP control section 250 determines the resolution of the virtual display, and then, sets the determined resolution in the virtual display driver 278 (step S14).

Then, the IP control section 250 generates the calibration data (step S15). The calibration data contains data for correction of the shapes of the images to be displayed on the projection surface 5 by the projectors 100 and data representing the ranges in which the projectors 100 display the images. The IP control section 250 generates the calibration data based on the first captured image, the second captured image, and the third captured image. The IP control section 250 stores the generated calibration data in the IP memory unit 260.

Then, the IP control section 250 determines whether or not to receive an operation to instruct the start of image supply to the projectors 100A, 100B, 100C (step S16). When not receiving the operation to instruct the start of image supply (step S16/NO), the IP control section 250 waits until receiving the operation.

When receiving the operation to instruct the start of image supply (step S16/YES), the IP control section 250 captures the image generated by the window system 277 and drawn in the IP memory unit 260 by the virtual display driver 278 (step S17).

Then, the IP control section 250 generates the divisional images to be supplied to the respective projectors 100 by division of the captured image based on the calibration data (step S18). Then, the IP control section 250 corrects the shapes of the divided divisional images based on the calibration data (step S19). The IP control section 250 outputs the shape-corrected divisional images to the corresponding projectors 100 (step S20).

As described above, the information processing apparatus 200 of the embodiment includes the calibration control unit 271, the virtual display driver 278, the display image generation unit 275, and the communication control unit 276.

The calibration control unit 271 acquires the first captured image by imaging of the projection surface 5 on which the image is projected by the projector 100A and the second captured image by imaging of the projection surface 5 on which the image is projected by the projector 100B.

The calibration control unit 271 determines the range in which the images to be projected by the projector 100A and the projector 100B are drawn of the virtual display drawing the images to be projected by the projector 100A and the projector 100B based on the first captured image and the second captured image.

The virtual display driver 278 draws the images to be projected by the projector 100A and the projector 100B in the range of the virtual display determined by the calibration control unit 271.

The display image generation unit 275 divides the image drawn in the virtual display into the first divisional image to be projected by the projector 100A and the second divisional image to be projected by the projector 100B.

The communication control unit 276 outputs the divided first divisional image to the projector 100A and the second divisional image to the projector 100B.

Therefore, the projector 100A and the projector 100B may realize tiling projection by projecting the images received from the information processing apparatus 200 on the projection surface 5. Accordingly, it is not necessary to make tiling projection settings for the projector 100A and the projector 100B for execution of tiling projection by the projector 100A and the projector 100B, and the convenience of the user may be improved.

The calibration control unit 271 specifies the first pre-transform range 301 in which the image projected by the projector 100A is captured of the first captured image. Further, the calibration control unit 271 specifies the second pre-transform range 302 in which the image projected by the projector 100B is captured of the second captured image.

The calibration control unit 271 calculates the transform rate for transforming the specified second pre-transform range 302 to a preset size, and transforms the specified first pre-transform range 301 using the calculated transform rate.

Further, the calibration control unit 271 determines the range in which the image is drawn in the virtual display based on the transformed first pre-transform range 301 and second pre-transform range 302.

Therefore, the range in which the image is drawn in the virtual display may be determined as a range corresponding to the preset size. For example, as the preset size, a size corresponding to the range of the projection surface 3 on which the image is displayed is used, and thereby, the image in the preset size may be projected on the projection surface 5.

The calibration control unit 271 specifies the first pre-transform range 301 in which the image projected by the projector 100A is captured of the first, captured image. Further, the calibration control unit 271 specifies the second pre-transform range 302 in which the image projected by the projector 100B is captured of the second captured image.

The calibration control unit 271 calculates the transform expression for transforming the specified second pre-transform range 302 into the size corresponding to the panel size of the liquid crystal panel 135B of the projector 100B. The calibration control unit 271 transforms the specified first pre-transform range 301 using the transform expression, and determines the range in which the image is drawn in the virtual display based on the transformed first imaging range and second imaging range.

Therefore, the range corresponding to the panel size of the liquid crystal panel 135B of the projector 100B may be determined as the range in which the image is drawn in the virtual display.

The calibration control unit 271 divides the image drawn in the virtual display into the first divisional image based on the range of the projection surface 5 imaged in the first captured image and the first imaging range.

Further, the calibration control unit 271 divides the image drawn in the virtual display into the second divisional image based on the range of the projection surface 5 imaged in the second captured image and the second imaging range.

Therefore, the image drawn in the virtual display may be divided into the first divisional image to foe displayed by the projector 100A and the second divisional image to be displayed by the projector 100B.

The above described embodiment is a preferred embodiment of the present disclosure. Note that, not limited to the above described embodiment, but various modifications can be made without departing from the scope of the present disclosure.

For example, in place of the imaging apparatus 500 of the above described embodiment, the projection surface 5 may be imaged by imaging sections provided inside of the projectors 100 and captured images may be generated.

When the number of the projectors 100 displaying images on the projection surface 5 increases, the projection surface 5 may be imaged by imaging sections of the plurality of projectors 100 and resolution of the virtual display may be determined based on these captured images.

The functions of the calibration control unit 271, the display image generation unit 275, and the communication control unit 276 of the information processing apparatus 200 may be provided in a server apparatus (not shown).

The server apparatus controls the projectors 100A, 100B, and 100C and the imaging apparatus 500 to acquire the first captured image, the second captured image, and the third captured image. The server apparatus determines the resolution of the virtual display based on these acquired images and generates the calibration data. The server apparatus transmits the determined resolution to the information processing apparatus 200. The information processing apparatus 200 generates image data with the resolution reported from the server apparatus and transmits the generated image data to the server apparatus. The server apparatus divides the image received from the information processing apparatus 200 based on the calibration data and generates the first divisional image, the second divisional image, and the third divisional image. The server apparatus transmits the generated first divisional image, second divisional image, and third divisional image to the corresponding projectors 100A, 100B, and 100C, respectively.

In the above described embodiment, the light modulation device 133A including the liquid crystal panels 135A is exemplified, and, the liquid crystal panel 135A may be a transmissive liquid crystal panel or a reflective liquid crystal panel. Alternatively, the light modulation device 133A may have a configuration using a digital mirror device in place of the liquid crystal panel 135A. Alternatively, a configuration combining a digital mirror device and a color wheel may be employed. Alternatively, the light modulation device 133A may have another configuration that can modulate the light emitted by the light source than the liquid crystal panel 135A and the digital mirror device.

The respective functional units of the projector 100A shown in FIG. 2 show the functional configurations, but the specific mounting forms are not particularly limited. That is, hardware individually corresponding to the respective functional units is not necessarily mounted and, obviously, the functions of the plurality of functional units can be realized by a single processor executing programs. In the above described embodiment, part of the functions realized by software may be realized by hardware or part of the functions realized by hardware may be realized by software. In addition, any changes can be made to the specific detailed configurations of the other respective parts of the projectors without, departing from the scope of the present disclosure.

The units of processing of the flowchart shown in FIG. 9 are formed by division according to the main parts of the processing for easy understanding of the processing by the information processing apparatus 200. The present disclosure is not limited by the way of division and the names of the units of processing shown in the flowchart in FIG. 9. The processing by the IP control section 250 may be divided into more units of processing according to the contents of the processing or divided so that a single unit of processing may contain more pieces of processing. The processing procedure of the above described flowchart is not limited to the illustrated example.

When the processing is realized using the computer of the information processing apparatus 200, the program to be executed by the computer can foe configured in a form of a recording medium or a transmission medium transmitting the program. For the recording medium, a magnetic optical recording medium or a semiconductor memory device may be used. Specifically, a portable or fixed recording medium such as a flexible disc, an HDD (Hard Disk Drive), a CD-ROM, a DVD, a Blu-ray disc, a magnetooptical disc, a flash memory, and a card-type recording medium may be used. Alternatively, the recording medium may foe a nonvolatile memory device such as a RAM, a ROM, and an HDD as internal memory devices provided in the server apparatus. The Blu-ray is a registered trademark.

What is claimed is:

1. An information processing apparatus comprising:
at least one processor programmed to
acquire a first captured image by imaging a projection surface on which an image light of a first projector is projected,
acquire a second captured image by imaging the projection surface on which an image light of a second projector is projected,
determine, based on the first captured image and the second captured image, a first drawing range including a first range in which a first image projected by the first projector is drawn and a second range in which a second image projected by the second projector is drawn,
determine a first imaging range in which the image light of the first projector is imaged of the first captured image,
determine a second imaging range in which the image light of the second projector is imaged of the second captured image,
calculate a transform expression for transforming a size of the second imaging range into a panel resolution of a drawing panel of the second projector, the drawing panel being configured to modulate light from a light source included in the second projector,
transform a size of the first imaging range into a transformed size of the first imaging range and the size of the second imaging range into a transformed size of the second imaging range using the transform expression,
determine the first range in which the first image is drawn and the second range in which the second image is drawn based on the transformed size of the first imaging range and the transformed size of the second imaging range,
draw an image, based on the first captured image and the second captured image, in the first drawing range,
divide the image into the first image based on the first range in which the first image is drawn and the second image based on the second range in which the second image is drawn,
output the first image to the first projector, and
output the second image to the second projector.

2. The information processing apparatus according to claim 1, wherein
the at least one processor
acquires a third captured image by imaging the projection surface on which an image light of a third projector is projected,
determines, based on the first captured image, the second captured image, and the third captured image, a second drawing range including the first range in which the first image is drawn, the second range in which the second image is drawn, and a third range in which a third image projected by the third projector is drawn,
draws the image in the second drawing range,
divides the image into the first image based on the first range in which the first image is drawn, the second image based on the second range in which the second image is drawn, and a third image based on the third range in which the third image is drawn,
outputs the first image to the first projector,
outputs the second image to the second projector, and
outputs the third image to the third projector.

3. An information processing system comprising:
an imaging apparatus acquiring a first captured image by imaging a projection surface on which an image light of a first projector is projected and a second captured image by imaging the projection surface on which an image light of a second projector is projected; and
an information processing apparatus including at least one processor programmed to
determine, based on the first captured image and the second captured image, a first drawing range including a first range in which a first image is projected by the first projector is drawn and a second range in which a second image projected by the second projector is drawn,
determine a first imaging range in which the image light of the first projector is imaged of the first captured image,
determine a second imaging range in which the image light of the second projector is imaged of the second captured image,
calculate a transform expression for transforming a size of the second imaging range into a panel resolution of a drawing panel of the second projector, the drawing panel being configured to modulate light from a light source included in the second projector,
transform a size of the first imaging range into a transformed size of the first imaging range and the size of the second imaging range into a transformed size of the second imaging range using the transform expression, determine the first range in which the first image is drawn and the second range in which the second image is drawn based on the transformed size of the first imaging range and the transformed size of the second imaging range, draw an image, based on the first captured image and the second captured image, in the first drawing range, divide the image into the first image based on the first range in which the first image is drawn and the second image based on the second range in which the second image is drawn, output the first image to the first projector, and output the second image to the second projector.

* * * * *